(12) United States Patent
Duperray

(10) Patent No.: US 12,017,868 B2
(45) Date of Patent: Jun. 25, 2024

(54) CONVEYING APPARATUS WITH BUFFERING UNIT

(71) Applicant: FORSPECTIVE, Chatereauroux (FR)

(72) Inventor: Philippe Duperray, Chatereauroux (FR)

(73) Assignee: FORSPECTIVE, Chatereauroux (FR)

(*) Notice: Subject to any disclaimer, the term of this patent is extended or adjusted under 35 U.S.C. 154(b) by 32 days.

(21) Appl. No.: 17/785,798

(22) PCT Filed: Dec. 16, 2020

(86) PCT No.: PCT/EP2020/086481
§ 371 (c)(1),
(2) Date: Jun. 15, 2022

(87) PCT Pub. No.: WO2021/122786
PCT Pub. Date: Jun. 24, 2021

(65) Prior Publication Data
US 2023/0057810 A1 Feb. 23, 2023

(30) Foreign Application Priority Data
Dec. 16, 2019 (EP) .................... 19315160

(51) Int. Cl.
*B65G 47/51* (2006.01)
*B65G 47/71* (2006.01)
*B65G 47/84* (2006.01)

(52) U.S. Cl.
CPC .......... *B65G 47/5113* (2013.01); *B65G 47/71* (2013.01); *B65G 47/715* (2013.01); *B65G 47/841* (2013.01)

(58) Field of Classification Search
CPC .. B65G 47/71; B65G 47/5113; B65G 47/715; B65G 47/841
(Continued)

(56) References Cited

U.S. PATENT DOCUMENTS 4,561,819 A 12/1985 Wiernicki
4,964,498 A 10/1990 Klingl
(Continued)

FOREIGN PATENT DOCUMENTS

DE 102006025090 B3 8/2007
EP 0216409 A1 4/1987
FR 2988709 A1 10/2013

OTHER PUBLICATIONS

International Search report for PCT/EP2020/086481, prepared by the European Patent Office, dated Mar. 22, 2021, 4 pages.

*Primary Examiner* — James R Bidwell
(74) *Attorney, Agent, or Firm* — Brooks Kushman P. C.; John E. Nemazi

(57) ABSTRACT

A conveying apparatus having a buffering unit extending between a receiving end and output end, including, a base conveyor, a distributing unit adapted to distribute a at least one incoming line of articles received at the receiving end into buffering lanes configured onto the base conveyor, and including a first closed loop track at the receiving end of the base conveyor. The first closed loop track having a distributing lugs, an accumulator unit extending away through the buffering to accumulate positioned on a base conveyor and oriented generally transversally to the first closed loop track, the second closed loop track including a plurality of accumulating lugs, Articles received at the buffering unit are moved along by distributing lugs and dropped into buffering lanes merging into a output lane, and having a second closed loop track on a base conveyor oriented transversally to the first closed loop track having accumulating lugs.

13 Claims, 7 Drawing Sheets

(58) Field of Classification Search
USPC .................................................... 198/347.4
See application file for complete search history.

(56) References Cited

U.S. PATENT DOCUMENTS

| | | | |
|---|---|---|---|
| 5,176,242 A | | 1/1993 | Wegscheider |
| 6,497,321 B2* | | 12/2002 | Horton ............... B65G 47/5131 |
| | | | 198/594 |
| 6,725,998 B2* | | 4/2004 | Steeber ................. B65G 21/18 |
| | | | 198/594 |
| 7,775,344 B2 | | 8/2010 | Balk |
| 9,394,117 B2 | | 7/2016 | Hanselman |
| 9,409,728 B2 | | 8/2016 | Bastian, II |
| 9,415,947 B2 | | 8/2016 | Steeber |
| 9,950,875 B2 | | 4/2018 | Walter et al. |
| 10,343,850 B2 | | 7/2019 | Rabec |
| 2016/0052726 A1* | | 2/2016 | Steeber .............. B65G 47/5127 |
| | | | 198/347.4 |
| 2017/0050332 A1* | | 2/2017 | Bauer ................ A22C 17/0093 |

* cited by examiner

CONVEYING APPARATUS WITH BUFFERING UNIT

CROSS-REFERENCE TO RELATED APPLICATION

This application is the U.S. national phase of PCT Application No. PCT/EP2020/086481 filed on Dec. 16, 2020, which claims priority to EP Patent Application No. 19315160.2 filed on Dec. 16, 2019, the disclosures of which are incorporated in their entirety by reference herein.

TECHNICAL FIELD

The present disclosure relates generally to conveying apparatus; and more particularly relates to a conveying apparatus having multi-lane buffering unit.

BACKGROUND

In the packaging industry, generally, the packaging of containers, such as cans, bottles, cups, and the like, inside various secondary packages involves multiple steps namely; receiving incoming beverage containers from in-feed towards an out-feed from where these containers are picked up for packaging purposes. Before being picked up, these containers must be arranged into groups so that a predetermined number (such as 2×3, 3×4, 3×6, etc) of the beverage containers arranged in a predetermined order can be easily loaded into an appropriate shipping package.

It has been noticed that due to certain reasons such as brief interruptions, process failures, and due to asynchronous movements of the infeed supply, the packaging at the out-feed may be halted and therefore the manufacturing unit and/or infeed may need to be temporarily stopped in such situation. However, in such situations, the manufacturing units is often left with a considerable volume of raw material, which, often has to be simply disposed off, once the manufacturing unit is restarted. Further, the containers already supplied through the infeed needs to be handled such that they are not damaged. Therefore, balancing the flow between an upstream process or in-feed station and a downstream process or out-feed station is important.

For this reason, it is highly desirable that a buffering means be provided to compensate for any difference in the number of containers produced and the number to be packed. The buffering means may generally be described as accumulating and/or storage means which is utilized to accumulate articles when the capacity of the packaging station is such that it cannot handle the number of articles being fed by the infeed station.

Various types of buffering means have been proposed. Conventionally, the use of various kind of buffer storage devices for such tasks is known. U.S. Pat. No. 4,964,498 disclose conveyors having side by side vertical storage buffers. U.S. Pat. No. 5,176,242 discloses two buffer magazines 12, 32 positioned one after the other.

U.S. Pat. No. 4,561,819 discloses a conveyor magazine having the shape of a vertical stack for storing articles. However, such a conveyor magazine does not include conveyors on each level of the magazine to load and withdraw articles and rather relies on external rollers to load and withdraw articles.

However, all such buffer means requires a great deal of floor space, which is not preferred. Due to space limitations and the cost of operating conveying lines, the efficiency of a conveyor system is a substantial consideration. Thus, buffer systems are often required to store articles on a conveyor system itself to maximize throughput efficiency.

Accordingly, numerous efforts have been imparted to produce conveyor apparatus which provide one or more buffering means that operate on the conveyor itself so as to lower the cost of these buffering means while improving their space efficiency. Generally, the known device comprises several buffering tracks/multiple parallel conveyor lanes used for accumulation, which are driven independently from each other to move products continuously along a conveying track to the out-feed station.

U.S. Pat. No. 7,775,344 B1 discloses apparatus having accumulators with multiple lanes that are arranged in various spiral configurations. These apparatuses further include a diverter at the infeed end and a merger at the discharge end. However, such diverter needs to be constantly moved to select the accumulating lane where products can be forwarded. Therefore, such devices would likely also be subject to upstream and downstream backups during operation.

WO Publication No. 2012078661 A1 tries to resolve the above problem by adding backups before and after each lane in the form of additional accumulators directly upstream and downstream of the lanes. However, such attempts to address these backup issues are extremely complex solutions. Further since, each of the lanes is independently driven, this also adds to the complexity of the apparatus and is therefore not preferred.

U.S. Pat. No. 9,409,728B2, resolves this by providing a case buffering apparatus that include a receiving or infeed vertical shuttle system, a matrix of horizontal accumulation conveyors (buffer), and a discharge vertical shuttle system. The apparatus further includes a vertical case shuttle system on either side of the vertical storage rack system for loading and unloading SKUs. The vertical case shuttle systems each include a plurality of vertical transports or shuttles that are able to move horizontally and vertically to deliver or pick the case from the appropriate horizontal buffer conveyor. The shuttles are able to load and unload cases at a single location within the vertical case shuttle system.

However, these all known apparatus have certain shortcomings, Firstly, the use of diverters at the infeed end requires a control system to select the lane where the article has to be buffered which adds to the complexity of the system. Moreover, none of these apparatuses provides a solution to convert the multiple lanes into a single or a dedicated number of lanes at the discharge end of the buffer conveyors while avoiding any collision/damage to the articles.

Accordingly, as can be seen from the foregoing discussion, it is an object of the present invention to provide a buffering conveying apparatus which while having a compact footprint, allows the possibility of buffering the infeed supply in a progressive manner and arranging the articles in a single or a plurality of lanes at the outfeed thereof. Thus, in the context of the above, a buffering conveying apparatus is desired, which while being cost effective and easy to implement allows to carry out progressive and automated buffering.

Further, it is an object of the present invention to provide contactless buffering in order to limit or even avoid any pushing pressure on the articles and in order to enable conveying articles that do not have the conventional cylindrical shape of round cans, round bottles, etc, or that may be manufactured from a variety of materials including paper, foils, thin plastic sheets etc.

It is also an object of the present invention to provide a buffering conveying apparatus that is optionally able to buffer from more than one infeed lane and optionally able to outfeed to several lanes simultaneously, which opens also the possibility to outfeed grouped articles.

It is further also an object of the present invention to provide a buffering conveying apparatus enabling buffering in FIFO (first-in-first-out) mode or non-FIFO mode.

Additionally, it is an object of the present invention to provide a buffering conveying apparatus enabling separating articles, then buffering followed by grouping, as well as separating articles, then grouping followed by buffering groups.

SUMMARY

In an aspect of the invention, a conveying apparatus is disclosed comprising a buffering unit extending between a receiving end towards an output end, the buffering unit comprising:
- a base conveyor:
- a distributing unit adapted to distribute a at least one incoming line of articles received at the receiving end into a plurality of buffering lanes configured onto the base conveyor, said distributing unit comprising a first closed loop track positioned at the receiving end of the base conveyor, the first closed loop track comprising a plurality of distributing lugs movingly configured thereon;
- an accumulator unit extending away from the distributing unit through the plurality of buffering lanes, the accumulator unit adapted to accumulate the articles received through the plurality of buffering lanes into a at least one output lane, said accumulator unit comprising a second closed loop track positioned on the base conveyor and oriented generally transversally to the first closed loop track, the second closed loop track comprising a plurality of accumulating lugs movingly configured thereon;
- wherein articles received at the buffering unit are each supported and moved along with one of the distributing lugs and dropped within one of the buffering lanes such that said articles are progressively distributed into a the plurality of buffer lanes towards the accumulator unit wherein the corresponding articles are picked by one of the accumulating lugs such that the one or more output lanes of articles are received at the output end.

The buffering unit is adapted to temporarily buffer the articles thereupon, when the rate at which an incoming supply of the articles is received from the infeed station is more than a rate of discharge at the out-feed station.

Optionally, the distributing unit further includes a separating means adapted to position one of the articles received at the receiving end towards one of the supporting/distributing lugs such that the article is supported by and moved along with the corresponding supporting lug across the first closed loop track. Such separating means may comprise a star-wheel a known in the art, or may comprise sensors electronically controlling the supporting lugs to pick one article at the receiving end.

Further, optionally the distributing unit includes an alignment unit configured onto a distal side of the first closed loop track, positioned generally transversally to the base conveyor and generally parallel to a longitudinal direction of the first closed loop track. The alignment unit includes a plurality of distributing gates each aligned with one of the pluralities of buffering lanes. The alignment unit may enhance buffering at high speed, and enhance alignment of slippery products. It cooperates with the supporting lugs to align articles released by the lugs.

The accumulator unit is generally adapted to accumulate the articles received through the plurality of buffering lanes into at least one output lane. The accumulator unit includes a second closed loop track oriented generally transversally to the first closed loop track. The second closed loop track includes a plurality of accumulating lugs movingly configured thereon.

Optionally, the accumulator unit further includes a guiding unit positioned generally parallel to a longitudinal direction of the second closed loop track. The guiding unit comprising a plurality of accumulating gates each aligned with one of the buffering lanes and adapted to receive the articles there through and deliver towards one of the accumulating lugs such that article is supported by and moved along with the corresponding accumulating lug across the second closed loop track towards the output lane at the outfeed end.

Said first and/or second closed loop track may be preferably positioned eccentrically with respect to the base conveyor.

In operation, the infeed article supply is received at the buffering unit where each of the article is supported and moved along with one of the supported lugs and dropped within one of the buffering lanes through the buffering unit such that the article supply is progressively delivered into the plurality of buffer lanes towards the accumulator unit. Further, the accumulator unit is adapted to receive the articles through one or more accumulating gates and selectively guides the corresponding article along one of the accumulating lugs towards the output lane such that a single output lane of the articles is received at the output end or in case of several output lanes that each article is received at the appropriate output lane. In the latter case, the articles may be immediately grouped over these several lanes.

Optionally, the conveying apparatus further includes a grouping unit extending away from the buffering unit adapted to group the outfeed supply received at the output station. The grouping unit is adapted to distribute a single outfeed lane of articles received from the buffering unit and then group them into a predetermined arrangement onto an outfeed conveyor having a plurality of grouping lanes. The grouping unit includes a third closed loop track comprising a plurality of grouping lugs movingly configured thereon. Such third closed loop track may be positioned eccentrically with respect to the base conveyor. The grouping unit further may optionally include a second separating means, e.g. a star-wheel, configured to position at least one of the articles along one of the grouping lugs such that the article is supported by and moved along with the corresponding grouping lug across the third closed loop track. The grouping unit furthermore includes a pair of parallel grouping tracks extending away from the third closed loop track, each positioned on one side of the outfeed conveyor. The pair of parallel grouping tracks includes a plurality of pairs of grouping movers connected to each other through a longitudinal bar.

Typically, a single lane outfeed article supply is received at the grouping unit where each of the articles is supported and moved along with one of the grouping lugs and dropped within one of the grouping lanes in accordance to the desired predetermined arrangement. Further, the plurality of grouping movers is moved in such a way that at least one of the longitudinal bar acts as a front bar and at least one of the other longitudinal bar acts as a back bar so as to form a group of articles of predetermined arrangement there between.

Possibly, the plurality of buffer lanes may be separate lanes configured onto the base conveyor.

Alternatively, the plurality of buffer lanes may be separate conveyors parallelly arranged together.

Possibly, the buffering unit includes a first movement mechanism for moving the plurality of supporting lugs onto the first closed loop track.

Further possibly, the first movement mechanism includes a plurality of support movers movingly configured onto the first closed loop track, each of the support movers adapted to movingly engage at-least one of the pluralities of supporting lugs.

Yet further possibly, the buffering unit includes a second movement mechanism for moving the plurality of accumulating lugs onto the second closed loop track.

Yet furthermore possibly, the second movement mechanism includes a plurality of accumulating movers movingly configured onto the second closed loop track, each of the second movers adapted to movingly engage at-least one of the plurality of second supporting lugs.

Preferably, the linear tracks may be powered by linear motors, typically
utilizing each of the movers as a rotor thereof and the corresponding track as a stator thereof.

Particularly, the alignment unit is a diverting structure having a plurality of horizontally configured alignment gates, each aligned with one of the buffering lanes.

Further, each of the alignment gate is configured in such a way that the article moves to a next gate only when a buffer lane to a previous gate is filled completely, due to eccentric position of the first closed loop track and the alignment unit.

Optionally, the accumulator unit is a diverting structure having a plurality of horizontally configured accumulating gates, each aligned with one of the buffering lanes.

Further optionally, each of the accumulating gate configured in such a way that the article is received from each of the buffer lanes such that the buffer lanes are emptied progressively.

Yet further optionally, each of the diverting structures is made in the form of longitudinal bar having a plurality of spaced apart branches forming the respective alignment gates/accumulating gates, aligned with one of the plurality of buffer lanes.

Possibly, each of the supporting lug is generally a supporting means having a shape in accordance to the shape of the article at a contact portion thereof so as to support and move at least one of the articles.

Possibly, the conveyor apparatus further comprising a control unit for optimizing the movement of each of the closed loop tracks, the base conveyor, the outfeed conveyor, the plurality of movers, and therefore the corresponding lugs and the moving article.

Further possibly, the control unit includes one or more sensors, one or more input unit, a processor unit and an output unit.

In yet another aspect of the invention, a method of buffering an incoming supply of articles onto the conveying apparatus of current disclosure, is provided. The method includes receiving one or more infeed supply of articles at the receiving end of the base conveyor. The method further includes positioning each of the articles of infeed supply towards the buffering unit where it is supported by and moved along at least one of the supporting/distributing lugs across the first closed loop track.

The method furthermore includes dropping the article away from the supporting lugs into one of the desired buffer lanes through the corresponding alignment gate association therewith. Additionally, the method includes receiving each of the articles from each of the buffer lanes at one of the accumulating lugs through the associated accumulating gate such that the article is supported therewith and move along the accumulating lugs towards a single lane outfeed supply.

Additionally, the method includes receiving the single outfeed supply at the grouping unit for forming a group of articles of a desired predetermined arrangement.

Possibly, the dropping of the articles from the supporting lug is determined by the control unit on the basis of an input from a user and/or input from the one or more sensors.

Alternatively, the dropping of the articles is performed in accordance with the inertia of the moving article such that the article is dropped towards a buffer lane having a space vacant for enabling a movement therein.

In the context of the present invention, the closed loop tracks as used in the buffering unit, as well as in the grouping unit, may have any type of circular shape, e.g. circular, elliptic, oval, or extending more longitudinally as shown in the drawings.

With regards to the grouping unit, person skilled in the art will appreciate that a grouping unit as described throughout this whole text may be a stand-alone unit, i.e. mounted and operating without a buffering unit preceding it.

The details of one or more implementations are set forth in the accompanying drawings and the description below. Other aspects, features and advantages of the subject matter disclosed herein will be apparent from the description, the drawings, and the claims.

DETAILED DESCRIPTION

The present application discloses a conveying apparatus having a buffering unit, for transferring an infeed supply of articles such as beverage containers, adapted to hold a plurality of contents such as food item including liquid foods, home essentials, stationary items, and the like, from an infeed station towards an outfeed station. The conveying unit while being efficient, is able to buffer articles without requiring any changes in the functional elements thereof. Further, the articles may be delivered in any desired manner and in any desired arrangement. While the articles in the context of the present invention are often cylindrical shaped beverage containers, it should be understood that the embodiments of the present invention may be applied in combination with various type of design and utilities irrespective of size, shape and materials.

Figure 1:
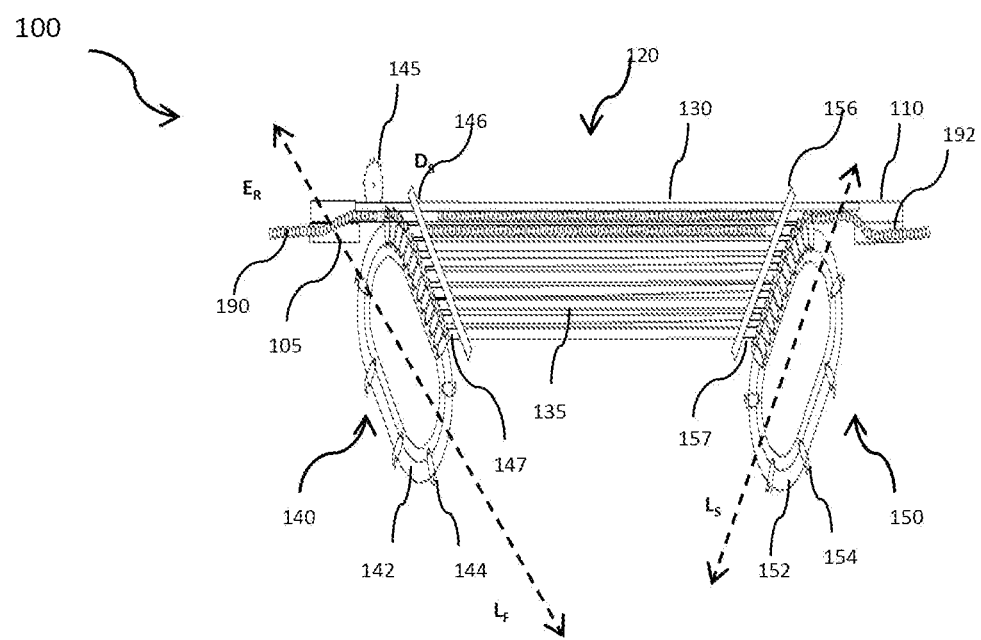
FIG. 1 illustrates a schematic diagram representing a conveying apparatus in accordance with a preferred embodiment of the present disclosure.

FIG. 1 illustrates a schematic diagram displaying a preferred embodiment of a conveying apparatus of the present disclosure. As illustrated in FIG. 1, the present disclosure provides a conveying apparatus 100 for conveying an infeed supply of articles 190 from an infeed station 105 at a receiving end $E_R$ towards an outfeed station 110 at an output end $E_O$. The conveying apparatus 100 includes a buffering unit 120. The buffering unit 120 includes a base conveyor 130 extending between the infeed station 105 and the outfeed station 110. The buffering unit 120 further includes a distributing unit 140 at the receiving end $E_R$ extended towards an accumulator unit 150 at the output end $E_O$ through a plurality of buffer lanes 135 configured there between, onto the base conveyor 130.

The distributing unit 140 includes a first eccentrically positioned closed loop track 142 comprising a plurality of supporting/distributing lugs 144 movingly configured thereon. The distributing unit 140 further includes a star-wheel 145 adapted to position each of the plurality of articles 190 received at the receiving end $E_R$ towards one of the supporting lugs 144 such that the article 190 is supported by and moved along with the corresponding supporting lug 144 across the first closed loop track 142. The distributing unit 140 further includes an alignment unit 146 configured onto a distal side $D_s$ of the first closed loop track 142, positioned generally eccentrically to the base conveyor 135 and generally parallel to a longitudinal direction $L_F$ of the first closed loop track 142. The alignment unit 146 includes a plurality of distributing gates 147 each aligned with one of the plurality of buffering lanes 135.

The accumulator unit 150 includes a second eccentric closed loop track 152 oriented generally transversally to the first closed loop track 142. The second closed loop track 152 includes a plurality of accumulating lugs 154 movingly configured thereon. The accumulator unit 150 further includes a guiding unit 156 positioned generally parallel to a longitudinal direction $L_s$ of the second closed loop track 152. The guiding unit 156 includes a plurality of accumulating gates 157 each aligned with one of the buffering lanes 135 and adapted to receive the articles 190 there through and deliver towards one of the accumulating lugs 154 such that article 190 is supported by and moved along with the corresponding accumulating lug 154 across the second closed loop track 152 towards a single output lane 192 at the outfeed end 110.

Figure 2:
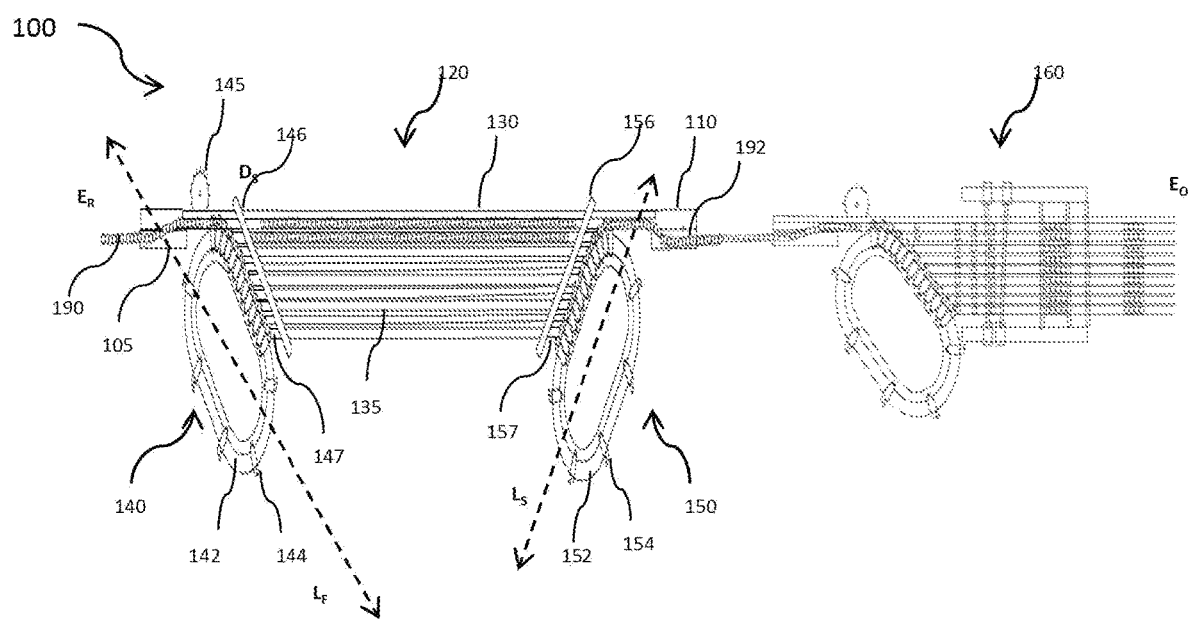
FIG. 2 illustrates a schematic diagram representing a conveying apparatus, in accordance with a preferred embodiment of the present disclosure.

As illustrated in FIG. 2, the conveying apparatus 100 may further include a grouping unit 160 positioned at the output end adapted to receive output feed 192 of articles 190.

In operation, the infeed article supply 190 is received at the buffering unit 120 where each of the articles 190 is selectively dropped within one of the buffering lanes 135 in such a way that the article supply 190 is progressively delivered into the plurality of buffer lanes 135 towards the accumulator unit 150. Further, the accumulator unit 150 is adapted to receive and selectively guides the articles 190 towards the outfeed 110 such that a single output lane 192 of the articles 190 is received at the output end $E_O$.

Figure 3A:
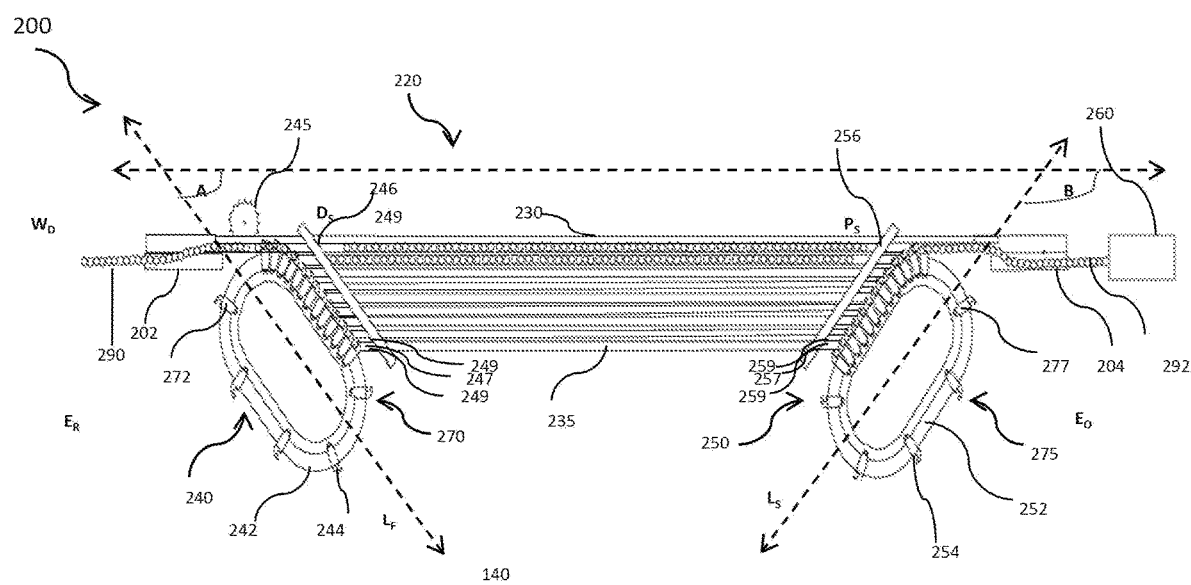
FIG. 3 illustrates a front view diagram representing an exemplary buffer unit, in accordance with a preferred embodiment of the present disclosure.

In description of the FIGS. 3a-2b that follow, elements common to the schematic system will have the same number designation unless otherwise noted. In a preferred embodiment, as illustrated in FIGS. 3a and 2b, an exemplary conveying apparatus 200 having an incoming feed line 202 carrying a continuous supply of beverage containers 290 and employing a buffer unit 220 for selectively buffering the beverage containers 290 while conveying the same towards an outgoing feed line 204 is provided. The apparatus 200 further includes a grouping unit 260 for grouping the one or more beverage containers 290, in a desired predetermined arrangement at an out-feed line 204. The in-feed conveying line 202 is generally a conveying apparatus adapted to facilitate a movement of a supply of beverage containers 290 from a source such as infeed station [not shown] towards a destination such as an outfeed station [not shown] adapted to perform packaging of the beverage containers 290 of the current disclosure.

In a preferred embodiment, the beverage container 290 is a generally cup shaped container having a generally cylindrical shape. While the shape of the beverage container 290 is cup shaped for exemplary purpose only, it should be understood that the beverage container 290 may be any kind of suitable containers (e.g., cans, bottles, etc) of any shape and size, including the radius and height suitable for enclosing its contents.

As disclosed earlier, the buffering unit 220 includes a base conveyor 230 extending between a receiving end $E_O$ towards an output end $E_O$, and adapted to receive an infeed supply of the plurality of beverage containers 290 from the in-feed conveying line 202 at the receiving end $E_R$. Further, the buffering unit 220 a distributing unit 240 extended towards an accumulator unit 250 configured onto the base conveyor 230.

The base conveyor 230 is generally a conveying apparatus having one or more means configured to suitably convey one or more lanes of the beverage containers 290 received thereon. In illustrated example, the conveyor 210 is a conveying belt conventionally known in the art. However, in other embodiments, any suitable conveyor such as for example, conveying tracks, rails, and the like may be used, without deviating from the scope of current disclosure. The base conveyor 230 is generally configured with a plurality of buffer lanes 235 adapted to enable the transfer of an individual lane there through. In some embodiments, the plurality of buffer lanes 235 is formed onto the base conveyor 230 by the dividing it using one or more guide rails, and the like. The advantage of such an embodiment is that multiple driving units are not required to drive the buffer lanes and therefore keeps the system inexpensive and simple to use. However, in other embodiments, the plurality of buffer lanes 235 may be in form of multiple parallel conveyors independently driven by their own powering mechanisms. While the exemplary embodiment includes eight buffer lanes 235, it may be understood and contemplated by a person skilled in the art, that any desired number of buffer lanes 235, may be utilized without deviating from the scope of the current disclosure.

The distributing unit 240 includes a first eccentrically positioned closed loop track 242 comprising a plurality of supporting/distributing lugs 244 movingly configured thereon. In a preferred embodiment, the first closed loop track is generally positioned such that a longitudinal axis $L_F$ thereof is at an angle A to the base conveyor 230. The angle A is generally an acute angle preferably ranging between 10 degrees and 90 degrees, or between 20 and 80, and preferably between 30 and 60. So, customization to certain angle can be done depending an application and depending on expected conveying speed.

The distributing unit 240 further includes a first movement mechanism 270 for moving each of the plurality of supporting lugs 244 onto the first closed loop track 242. In an embodiment, the first movement mechanism 270 includes a plurality of support movers 272 movingly configured onto the first closed loop track 242, each of the support movers 272 adapted to movingly engage one of the plurality of supporting lugs 244.

The distributing unit 240 further includes a star-wheel 245 adapted to position each of the plurality of articles 290 received at the receiving end $E_R$ towards one of the supporting lugs 244 such that the article 290 is supported by and moved along with the corresponding supporting lug 244 across the first closed loop track 242. The star-wheel 245 is generally adapted to avoid any possibility of falling down and/or get damaged at the receiving end $E_R$ due to centrifugal impact of these containers 290, since this apparatus generally receives infeed supply 290 at particularly higher speed. In some embodiments, the start wheel 245 may be replaced with any suitable mechanism conventionally known in the art without deviating from the scope of current disclosure.

The distributing unit 240 further includes an alignment unit 246 configured onto a distal side $D_s$ of the first closed loop track 242, positioned generally eccentrically to the base conveyor 235 and generally parallel to the longitudinal axis $L_F$ of the first alignment unit 246 is generally positioned is at the angle substantially same as that of angle A, to the base conveyor 230. The alignment unit 246 is generally a diverting structure adapted to selectively align a flow of the already distributed beverage containers 290 within one of the buffer lanes 235. In a preferred embodiment, as illustrated in FIG., the alignment unit 246 includes a generally bar based structure extending generally over an entire eccentric width WD, parallel to the longitudinal axis $L_F$ of the base conveyor 230. The alignment unit 246 further includes a plurality of horizontally configured alignment gates, each aligned with one of the buffering lanes 235 In a preferred embodiment number of alignment gate is same as the number of buffer lanes 235. The alignment gates 247 may be formed of a plurality of vertical branching rails 249 such that each combination of two consecutive rails 249 acts as one of the alignment gates 247. Further, each of the branching rails has a proximal portion and a distal portion. The proximal portion of each of the branching rails 249 is at a predetermined distance $D_s$ away from the eccentric positioned first closed loop track. Such a configuration allows the possibility of progressively delivery of the articles 290 within any buffer lane 235 after previous lanes besides it is filled completely. However, in other embodiments, the delivery of the articles 290 within the buffer lane is selected dynamically on the basis of one or more predetermined logics and dynamic selection by lugs such that can be chosen between FIFO and non FIFO mode, or even grouping at delivery in the lanes and buffering grouped articles.

The accumulator unit 250 includes a second eccentrically positioned closed loop track 252 oriented generally transversally to the first closed loop track 242 such that a longitudinal axis $L_s$ of the second closed loop track 252 is at an angle B to the base conveyor 230, and generally intersects with the longitudinal axis $L_F$ of the first closed loop track 242.

In a preferred embodiment, where the angle A is generally an acute angle preferably ranging between 40 degree and 70 degree, the angle B is an obtuse angle ranging between 100 degree and 130 degree. However, in other embodiments, where the angle A is an obtuse angle preferably ranging between 100 degree and 130 degree, the angle B is an obtuse angle ranging between 100 degree and 130 degree.

The accumulator unit 250 includes a plurality of accumulating lugs 254 movingly configured onto the second closed loop track 252. The accumulator unit 250 further includes a second movement mechanism 275 for moving each of the plurality of accumulating lugs 254 onto the second closed loop track 252. In an embodiment, the second movement mechanism 275 includes a plurality of accumulating movers 277 movingly configured onto the second closed loop track 252, each of the accumulating movers 277 adapted to movingly engage one of the plurality of accumulating lugs 254.

The accumulator unit 250 further includes a guiding unit 256 configured onto a proximal side $P_s$ of the second closed loop track 252, positioned generally eccentrically to the base conveyor 235 and generally parallel to the longitudinal axis $L_s$ of the second closed loop track 252. The guiding unit 256 is generally a diverting structure adapted to selectively receive and/or accumulate a flow of the already distributed beverage containers 290 from one of the buffer lanes 235. In a preferred embodiment, as illustrated in FIG. 3a, the guiding unit 256 includes a generally bar based structure extending generally over an entire eccentric width WD, parallel to the longitudinal axis $L_s$ of the second closed loop track 252. The guiding unit 256 further includes a plurality of horizontally configured accumulating gates 257, each aligned with one of the buffering lanes 235. In a preferred embodiment number of accumulating gate 257 is same as the number of buffer lanes 235. The accumulating gates 247 may be formed of a plurality of vertical accumulating rails 249 such that each combination of two consecutive accumulating rails 249 acts as one of the accumulating gates 247 to receive one or more containers 290 from the associated buffer lane 235. Further, each of the branching rails has a proximal portion and a distal portion. The proximal portion of each of the branching rails 259 is at a predetermined distance X away from the eccentric positioned second closed loop track 252. Such a configuration allows the possibility of progressively evacuation of the articles 290 from any buffer lane 235 only after a previous lanes besides has been evacuated completely. However, in other embodiments, the evacuation of the articles 290 from the buffer lanes 235 is selected dynamically on the basis of one or more predetermined logics, to be discussed later.

In some preferred embodiments, each of the supporting lugs 244 and the accumulating lugs 254 is formed into a predetermined shape in accordance to a shape of the one or more contact portions of the beverage container 290. Accordingly, the predetermined shape of each of the supporting lugs 244, and the accumulating lugs 254 is same and is of a shape complementary to the shape at the contact portion of the beverage container 290. For example, in a preferred embodiment, the beverage container is a generally cup shaped container with generally rounded corners. In such an embodiment, each of the supporting lugs 242, is of shape same as that of the accumulating lugs 254 and is a generally arc shaped structure adapted to movingly support the generally rounded corners of the beverage container 290. However, the supporting lugs, as well as the accumulating lugs may have any form adapted to support any article shape.

In use, as disclosed earlier, the conveying apparatus 200 is adapted to be positioned onto an output line of a manufacturing unit carrying a supply of beverage containers 290 to be conveyed towards a packaging station. The conveying apparatus 200 receives a continuous supply of the beverage containers 290 through the infeed line 202 which are first received at buffering unit 220 where the supply of article is individually distributed into one or more of plurality of buffer lanes 235 by action of the distributing unit 230. The plurality of article supply is then received at the accumulation unit 250 which accumulates the beverage containers from the multiple buffer lanes 235 and sends towards the single outfeed lane 292 at the outfeed line 204.

In some embodiments of the current disclosure, the conveying apparatus 200 further includes a grouping unit 300 adapted to group a single lane supply 292 of the beverage containers 290 received through the outfeed line 202, them into a group of a desired predetermined arrangement.

The grouping unit 300 includes a second distributing unit 340 adapted to receive a single lane supply 292 of the beverage containers 290 from the outfeed line 202 through a second start wheel 325. The grouping unit 300 further includes an outfeed conveyor 330 extending away from the second distributing unit 320 towards a grouping station 350 configured thereon at the output end $E_O$.

The outfeed conveyor 330 is generally a conveying apparatus having one or more means configured to suitably convey one or more lanes of the beverage containers 290 received thereon. In illustrated example, the conveyor 330 is a conveying belt conventionally known in the art. However, in other embodiments, any suitable conveyor such as for example, conveying tracks, rails, and the like may be used, without deviating from the scope of current disclosure. The outfeed conveyor 330 at the is generally configured with a plurality of grouping lanes 335, each adapted to enable the transfer of an individual lane there through. In some embodiments, the plurality of grouping lanes 335 is formed onto the outfeed conveyor 330 by the dividing it using one or more guide rails, and the like. The advantage of such an embodiment is that multiple driving units are not required to drive the buffer lanes and therefore keeps the system inexpensive and simple to use. However, in other embodiments, the plurality of grouping lanes 335 may be in form of multiple parallel conveyors independently driven by their own powering mechanisms. While the exemplary embodiment includes six grouping lanes 335, it may be understood and contemplated by a person skilled in the art, that any desired number of grouping lanes 335, may be utilized without deviating from the scope of the current disclosure.

The second distributing unit 340 is generally adapted to receive the beverage containers 290 and selectively distribute towards one or more of plurality of grouping lanes 335. includes a third eccentrically positioned closed loop track 342 comprising a plurality of grouping lugs 344 movingly configured thereon. In a preferred embodiment, the third closed loop track is generally positioned such that a longitudinal axis LT thereof is at an angle C to the outfeed conveyor 330. The angle C is generally an acute angle preferably ranging between 30 degree and 60 degree. However, in other embodiments, the angle C may be an obtuse angle preferably ranging between 100 degree and 140 degree. In yet other embodiments, the angle C may be any suitable angle without deviating from the scope of current disclosure.

The second distributing unit 340 further includes a third movement mechanism 370 for moving each of the plurality of grouping lugs 244 onto the third closed loop track 342. In an embodiment, the third movement mechanism 370 includes a plurality of second movers 372 movingly configured onto the third closed loop track 342, each of the second movers 372 adapted to movingly engage one of the plurality of grouping lugs 344.

The grouping station 350 is adapted to group the beverage containers received onto the one or more plurality of beverage containers 290 received onto the different grouping lanes 335. The grouping station 350 further includes a pair of parallel tracks 360, each positioned on a different side generally parallel to the outfeed conveyor 330 and extending away from third closed loop track 340 towards the output end $E_O$. The grouping station 350 further includes a plurality of pair of independently movable grouping movers 362 movingly configured onto the pair of tracks 360, and connected to each other through a longitudinal grouping bar 364. Each of the longitudinal grouping bar 364 is adapted to optionally and selectively push one or more rows of beverage containers 290 received onto the outfeed conveyor 330 so as to optionally accelerate and/or decelerate the rows to arrange them in form of groups 370 of the beverage containers 290, such that a first longitudinal bar 364a of the plurality of longitudinal bars 364 acts as a front bar and a second longitudinal bar 364b of the plurality of longitudinal bars 364 acts as a back bar so as to form a group 370 of beverage containers 290 in the desired predetermined arrangement.

The conveying apparatus 200 further includes a first powering means [not shown] for enabling a movement of the one or more incoming conveying line 202, the outfeed conveying line 204, the base conveyor 230, the outfeed conveyor 330, and various sub-components thereof.

Figure 4:
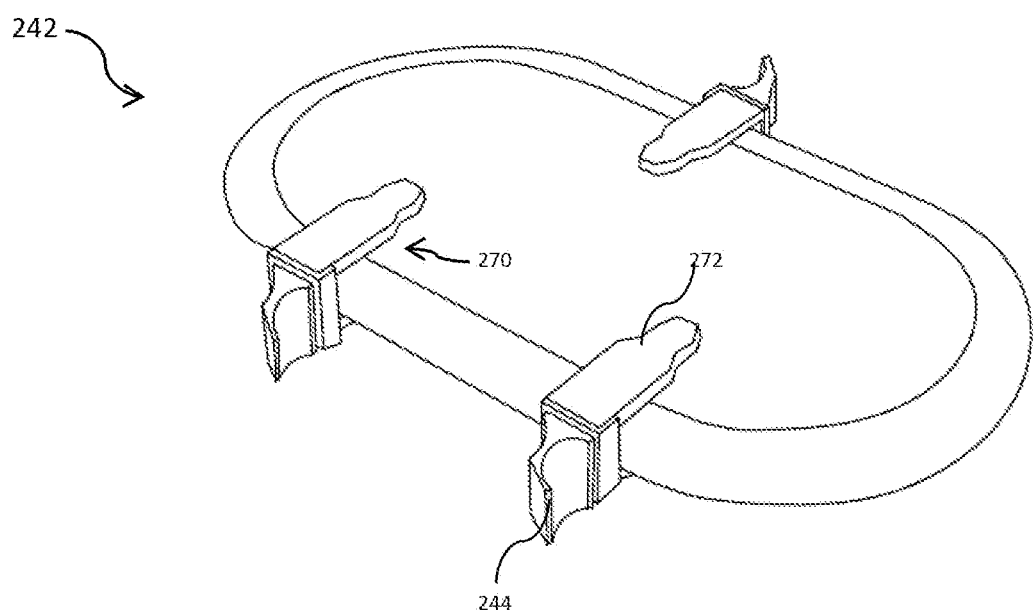
FIG. 4 illustrates an exemplary closed loop track, in accordance with a preferred embodiment of the present disclosure.
Figure 5:
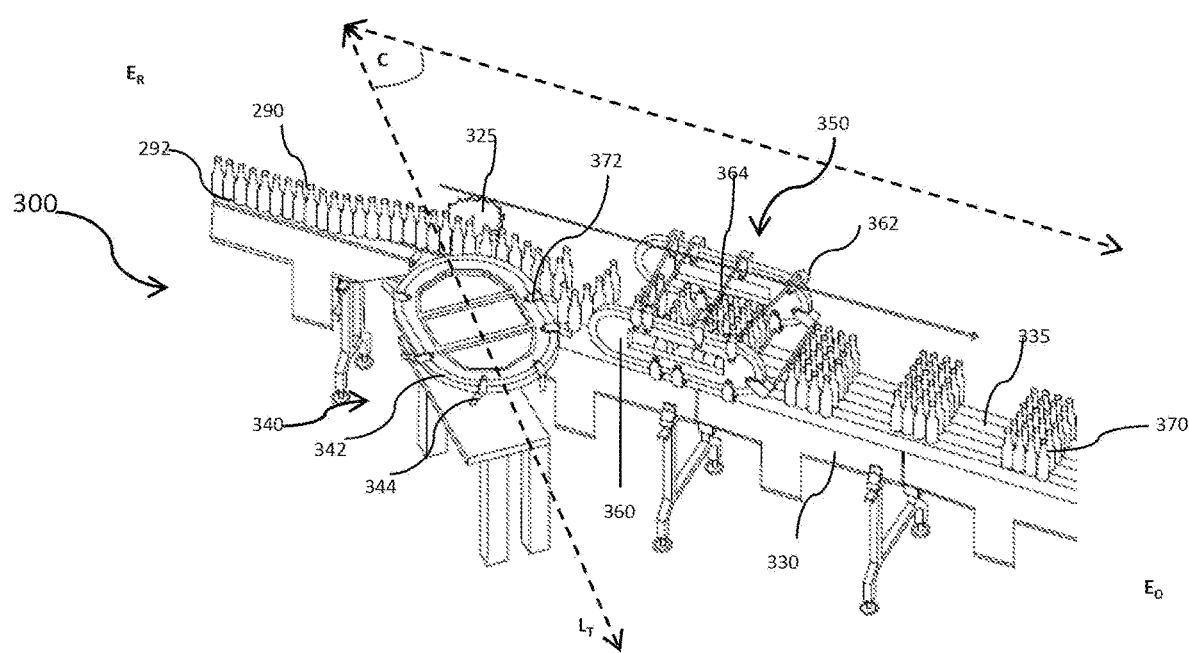
FIG. 5 illustrates a perspective view diagram representing an exemplary grouping unit, in accordance with the preferred embodiment of the present disclosure; grouping in columns, not in lanes
Figure 6:
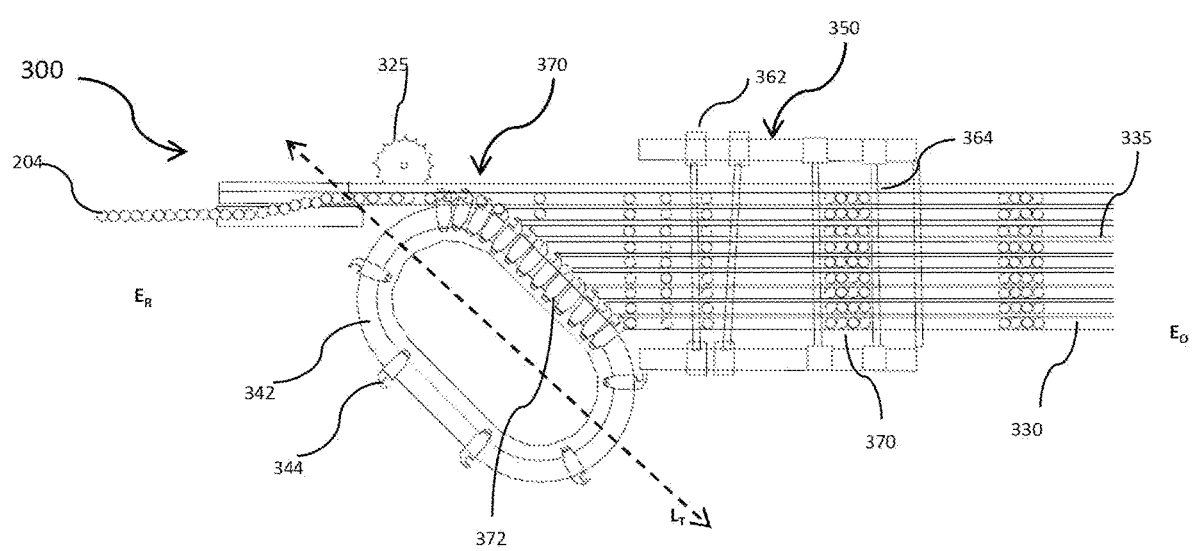
FIG. 6 illustrates a schematic diagram representing a grouping operation, in accordance with a preferred embodiment of the present disclosure.

The conveying apparatus 200 further includes a second powering means [not shown] for enabling a movement of each of the movers including, the supporting movers 272, the accumulating movers 277, the second movers 372, and the grouping movers 362, independently along the corresponding closed loop tracks. In a preferred embodiment, the second powering means comprise linear motors. In such an embodiment, the linear motor is a generally moving magnet type of motor conventionally known in the art. Further in such embodiments, the linear motor utilizes the corresponding closed loop tracks as a stator and each of the movers 272, 277, 372, 362, as a rotor thereof. In such an embodiment, each of pair of closed loop tracks include an interior portion (not shown) accessible through an open end. The closed loop tracks in such embodiments further includes a plurality of coils fixedly arranged in a longitudinal direction within the interior portion thereof. Further in such embodiments, as illustrated in FIG. 4, each of the movers 272, 277, 372, 362, is similar in configuration and is generally in the form of a U shaped magnetic yoke having a permanent magnet positioned therewithin on mutually facing inner sides thereof such that when positioned onto the corresponding tracks, each of the of the yoke forms a magnetic circuit and said stator being positioned between the permanent magnets. Further, each of the movers 272, 277, 372, 362, include a sliding mechanism such as a roller, or the like, supported by one or more roller-supporting portions formed at lower ends of the corresponding closed loop tracks. In operation when current is passed through the stator, a uniform magnetic field is generated and on the basis of polarity of permanent magnets, a movement of each of the movers 272, 277, 372, 362, is achieved. Further, the speed, direction and other parameters may be controlled in accordance with the direction, intensity, etc of the flow of the current applied thereupon.

In other embodiments, each of the movers 272, 277, 372, 362, are utilized as stator whereas the corresponding closed loop tracks are utilized as the rotors. In such an embodiment, each of the movers 272, 277, 372, 362, includes built in coils and each of the corresponding tracks include a plurality of magnets configured thereon in a longitudinal direction such that the movers are able to come into an electromagnetic interaction thereby enabling a movement thereof.

The conveying apparatus 200 may include one or more control unit [not shown] for managing the operations thereof, and particularly for managing the working of the first powering means and/or the second powering means and more particularly the movement of the each of the movers 272, 277, 372, 362, so as to optimize the movement of the corresponding lugs 242, 272, 372, 362 such that a desired distribution and/or grouping of the beverage containers 290 is achieved.

In some embodiments, the control unit may include an input unit for receiving the predetermined desired arrangement of the beverage containers 290 to be formed at the grouping unit 300. Further, the control unit may include a plurality of sensors [not shown] for tracking the parameters such as for example, position of the containers and/or rows of containers to be buffered and/or grouped, number of containers within each row, speed of movement, and the like. The control unit may further include a processor unit for processing the data captured by the input unit on the basis of predetermined logics/rules for facilitating the movement of the plurality of movers 272, 277, 372, 362. The control unit may further include an instruction unit that delivers the instructions to various components such as various powering means, linear motors, motors, driving units, or the like, to facilitate a desired and smooth operation.

In some embodiments, the control unit may be provided as a computer program product, such as may include a computer-readable storage medium or a non-transitory machine-readable medium maintaining instructions interpretable by a computer or other electronic device, such as to perform one or more processes. A non-transitory machine-readable medium includes any mechanism for storing information in a form (including a processing application or software) readable or interpretable by a machine (such as a computer). The non-transitory machine-readable medium may take the form of, but is not limited to, any known storage technique, including magnetic storage media, optical storage media, magneto-optical storage media; read only memory (ROM); random access memory (RAM); erasable programmable memory (including EPROM and EEPROM); flash memory; and otherwise.

Figure 3B:
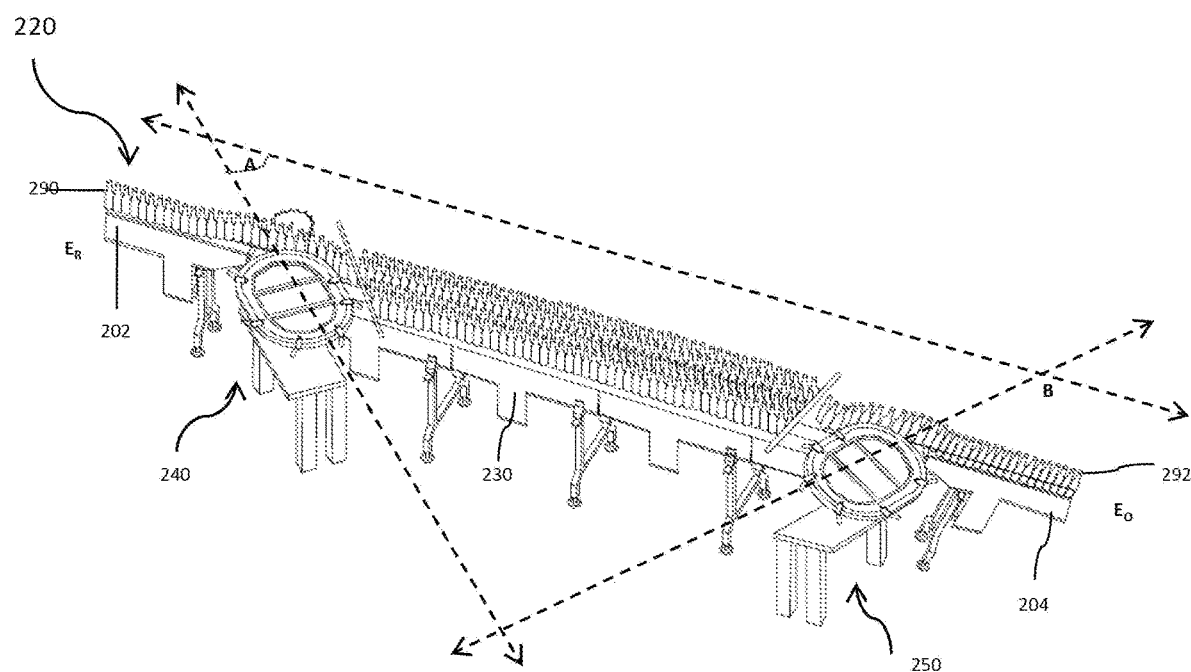

FIGS. 3 and 3 schematically show the arrangement of the basic components of the conveying apparatus 200 of the present disclosure. However, in the construction of commercial functional units, secondary components such as couplers, connectors, support structure and other functional components known to one of skill in the field of conveying apparatus and more particularly the buffering units for use with conveyor systems, may be incorporated within the conveying apparatus 200. Such commercial arrangements are included in the present invention as long as the structural components and arrangements disclosed herein are present. Accordingly, it is to be contemplated that the conveying apparatus 200 may be configured to be used for any kind of articles of any possible shape, size and dimensions, as deems possible without deviating from the scope of the current invention.

INDUSTRIAL APPLICABILITY

The present disclosure relates to a conveying apparatus 200 having a buffering unit 220 adapted to temporarily accumulate any type the articles 290, i.e. cylindrical and non-cylindrical, and made of any type of material including glass, metal, paper, foils, thin plastic, and any combination.

The buffering unit of the current disclosure may be easily integrated into an existing conveyor line without any axial offset. Further, since there is a plurality of parallel buffer lanes, the buffering unit may be accommodated within a small base area and at a height which is mostly suitable to be handled by the users. Particularly advantageously, the utilization of such a buffering unit avoids the need of backing up the products at the infeed and/or at the outfeed.

Further, since the current buffering unit consists of plurality of buffer lanes configured onto a same conveyor means, the apparatus is simple to use and avoids adding to the complexity and costs for managing a plurality of individual buffer conveyors. Accordingly, the current conveying apparatus having buffering unit provide an improved system so to achieve lower cost per article and higher space efficiency, and therefore enabling a cost-effective inclusion of even slower moving articles.

Particularly advantageously, the buffering means of the current disclosure is configured to progressively and uniformly distribute articles into the individual tracks or lanes. Further, the dropping of the articles within the respective buffer lane may be controlled individually, and possibly, for example, as a function of sensor signals which are supplied by one or more sensors that monitor the distribution of the articles over the individual tracks buffer lanes of the base conveyor. Therefore, the current apparatus is well suited to fully automate the conveying process.

Further, the conveying apparatus is adaptable to different shapes and sizes of articles, and is therefore well suitable to process the conveying of different sizes with ease and efficiently. Moreover, the predetermined shape may be changed by simply changing the lugs 244, 274 and therefore not requiring to change the entire apparatus for different predetermined shapes.

The present buffering conveying apparatus provides the possibility of grouping articles immediately after buffering by providing outfeed via different lanes enabling formation of groups over the lanes. It is obvious that accordingly buffering and grouping can be achieved with limited machine footprint compared to conventional apparatuses.

Alternatively, the present disclosure provides the possibility of manufacturing the conveyor system with integrally formed grouping unit. Such a conveyor system for conveying and packaging articles into predetermined arrangement, while being cost-efficient, is very quick and easy to use and offers comfortable handling of articles of any shape, size or any variety of configurations.

Further, since the articles are released in the buffering lanes by the distributing lugs, and picked again by accumulating lugs for outfeed, they are conveyed contactless. This also enables conveying articles that do not resist the pushing pressure in conventional buffering conveyors, or that do not have the conventional cylindrical shape of round cans, round bottles, etc.

As the distributing and accumulating lugs are moved by movers on the closed loop tracks, they enable respectively releasing or picking an article at any lane. Therefore, the buffering conveying apparatus of the present invention offers much more flexibility while buffering than conventional buffering apparatuses. Firstly, the apparatus enables buffering in FIFO (first-in-first-out) mode as well as non-FIFO mode. Additionally, the apparatus enables separating articles, then buffering followed by grouping, as well as separating articles, then grouping and buffering grouped articles.

Additionally, since the buffering unit 220 of the current disclosure while being applicable onto the conveyor apparatus 200, does not impact the rest of the conveying process. A single conveyor apparatus 200 may utilize as many as buffering units 220 within the same arrangement.

While the conveying apparatus 200 is described primarily for conveying, buffering and grouping beverage containers, it is also contemplated for a person skilled in the art that the buffering means 220 of the current disclosure may be implemented in various industries such as food industry, transport industry, house hold appliance industry in transportation of any kind of product or group of products, of any shape, size or any variety of configurations, without limiting it to the beverage industry.

I claim:

1. A conveying apparatus comprising a buffering unit extending between a receiving end towards an output end, the buffering unit comprising:
   a base conveyor:
   a distributing unit adapted to distribute at least one incoming line of articles received at the receiving end into a plurality of buffering lanes configured onto the base conveyor, said distributing unit comprising a first closed loop track positioned at the receiving end of the base conveyor, the first closed loop track comprising a plurality of distributing lugs movingly configured thereon; and
   an accumulator unit extending away from the distributing unit through the plurality of buffering lanes, the accumulator unit adapted to accumulate the articles received through the plurality of buffering lanes into at least one output lane, said accumulator unit comprising a second closed loop track positioned on the base conveyor and oriented generally transversally to the first closed loop track, the second closed loop track comprising a plurality of accumulating lugs movingly configured thereon;
   wherein articles received at the buffering unit are each supported and moved along with one of the distributing lugs and dropped within one of the buffering lanes such that said articles are progressively distributed into the plurality of buffer lanes towards the accumulator unit wherein the corresponding articles are picked by one of the accumulating lugs such that the one or more output lanes of articles are received at the output end, and
   wherein the first distributing unit comprising a plurality of distributing movers, each engaging one of the distributing lugs for enabling a longitudinal movement thereof onto the corresponding first closed loop track.

2. The conveying apparatus of claim 1 wherein the distributing unit comprises a separating means, e.g. a star wheel, configured onto a proximal side of the first closed loop track, and adapted to position at least one of the articles along one of the distributing lugs such that the article is supported by and moved along with the corresponding distributing lug across the first closed loop track.

3. The conveying apparatus of claim 1 wherein the distributing unit comprises an alignment unit configured onto a distal side of the first closed loop track, positioned along longitudinal direction of the first closed loop track, the alignment unit comprising one or a plurality of distributing gates each aligned with one of the buffering lanes.

4. The conveying apparatus of claim 1 wherein the accumulator unit comprises a guiding unit positioned generally parallel to a longitudinal direction of the base conveyor, the guiding unit comprising a plurality of accumulating gates each aligned with one of the buffering lanes and adapted to receive the articles there through.

5. The conveying apparatus of claim 1, further comprising a grouping unit extending away from the accumulator unit, the grouping unit comprising:

a second distributing unit adapted to distribute a single incoming lane of articles received from the buffering unit, the second distributing unit comprising:
   a third closed loop track comprising a plurality of second distributing lugs movingly configured thereon;
   a second distributing unit configured onto a distal side of the third closed loop track, positioned generally eccentrically to the base conveyor and generally parallel to a longitudinal direction of the third closed loop track, the second distributing unit comprising a plurality of second distributing gates each providing an output towards one of a plurality of distributing lanes onto the base conveyor;
   a pair of parallel grouping tracks extending away from the third closed loop track, each positioned on one side of the base conveyor, the pair of parallel grouping tracks comprising a plurality of pairs of grouping movers, each pair of grouping movers connected through a longitudinal bar;
   wherein when the single lane of the articles is received at the grouping unit, the articles are first distributed into multiple lanes onto the distributing lanes of the base conveyor between the pair of parallel tracks wherein further the plurality of grouping movers are moved in such a way that at least one of the longitudinal bar acts as a front bar and at least one of the other longitudinal bar acts as a back bar so as to form a group of articles of predetermined arrangement there between.

6. The conveying apparatus of claim 1 further comprising a control unit for optimizing a movement of each of the parallel grouping tracks, the base conveyor, the plurality of movers and therefore the moving articles.

7. The conveying apparatus of claim 1, wherein the accumulator unit comprising a plurality of accumulating movers, each engaging one of the accumulating lugs for enabling a longitudinal movement thereof onto the corresponding second closed loop track.

8. The conveying apparatus of claim 1, wherein each of the lugs including the distributing lugs and/or accumulating lugs is of a shape and/or size suitable to movingly support the moving article in a direction of its movement, at least partially at a contact surface thereof.

9. The conveying apparatus according to claim 1, wherein the closed loop tracks are powered by a linear motor.

10. The conveying apparatus of claim 1, wherein the alignment unit is a diverting structure having a plurality of horizontally configured alignment gates, each aligned with one of the buffering lanes and configured in such a way that the article moves to a next gate only when a buffer lane to a previous gate is filled completely due to eccentric position of the first closed loop track and the alignment unit.

11. The conveying apparatus of claim 10, wherein the diverting structure is made in the form of longitudinal bar having a plurality of spaced apart branches forming the respective alignment gates/accumulating gates, each branch aligned with one of the plurality of buffer lanes.

12. The conveying apparatus of claim 1, wherein the accumulator unit is a diverting structure having a plurality of horizontally configured accumulating gates, each aligned with one of the buffering lanes and configured in such a way that the article is received from each of the buffer lanes so as to be accumulated into at least one lane wherein further the buffer lanes are emptied progressively starting from the last lanes towards the first lane due to eccentric position of the second closed loop track and the accumulating unit.

13. The conveying apparatus of claim 12, wherein the diverting structure is made in the form of longitudinal bar having a plurality of spaced apart branches forming the respective alignment gates/accumulating gates, each branch aligned with one of the plurality of buffer lanes.

\* \* \* \* \*